US 8,249,382 B2

(12) United States Patent
Teshima et al.

(10) Patent No.: US 8,249,382 B2
(45) Date of Patent: Aug. 21, 2012

(54) IMAGE-CAPTURING APPARATUS, IMAGE PROCESSING METHOD AND PROGRAM PRODUCT

(75) Inventors: Yoshihiro Teshima, Tokorozawa (JP); Keiichi Sakurai, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 978 days.

(21) Appl. No.: 11/656,865

(22) Filed: Jan. 22, 2007

(65) Prior Publication Data
US 2007/0177818 A1     Aug. 2, 2007

(30) Foreign Application Priority Data
Jan. 27, 2006   (JP) ................................. 2006-019681

(51) Int. Cl.
*G06K 9/36* (2006.01)
(52) U.S. Cl. ...................... 382/276; 345/629; 348/222.1; 348/239; 358/471; 358/474; 358/519; 382/118; 382/162; 382/170; 382/190; 382/203; 382/218; 382/275; 382/283; 382/284
(58) Field of Classification Search .......................... None
See application file for complete search history.

(56) References Cited

U.S. PATENT DOCUMENTS

| 5,585,926 | A  | * | 12/1996 | Fujii et al. | ...................... | 358/471 |
| 5,787,199 | A  | * | 7/1998  | Lee | ................ | 382/203 |
| 6,128,416 | A  | * | 10/2000 | Oura | ............................ | 382/284 |
| 6,167,167 | A  | * | 12/2000 | Matsugu et al. | .............. | 382/283 |
| 6,301,382 | B1 | * | 10/2001 | Smith et al. | ................... | 382/162 |
| 6,404,936 | B1 | * | 6/2002  | Katayama et al. | ............. | 382/283 |
| 6,977,664 | B1 | * | 12/2005 | Jinzenji et al. | ................. | 345/629 |
| 6,987,535 | B1 | * | 1/2006  | Matsugu et al. | .............. | 348/239 |
| 2002/0041406 | A1 | * | 4/2002  | Takahashi et al. | ............. | 358/519 |
| 2002/0044691 | A1 | * | 4/2002  | Matsugu | ....................... | 382/218 |
| 2002/0146169 | A1 | * | 10/2002 | Sukthankar et al. | .......... | 382/170 |
| 2005/0196070 | A1 | * | 9/2005  | Takakura et al. | .............. | 382/284 |
| 2005/0225648 | A1 | * | 10/2005 | Lin et al. | ..................... | 348/222.1 |
| 2006/0033967 | A1 | * | 2/2006  | Brunner | ........................ | 358/474 |

(Continued)

FOREIGN PATENT DOCUMENTS

| JP | 02127762 A | * | 5/1990 |
| JP | 4-111079 A | | 4/1992 |
| JP | 2000-331115 A | | 11/2000 |

(Continued)

OTHER PUBLICATIONS

Japanese Office Action dated Mar. 3, 2009 (2 pages), and English translation thereof (2 pages) issued in counterpart Japanese Application No. 2006-019681.

*Primary Examiner* — Anand Bhatnagar
*Assistant Examiner* — Tsung-Yin Tsai
(74) *Attorney, Agent, or Firm* — Holtz, Holtz, Goodman & Chick, PC

(57) ABSTRACT

An image-capturing apparatus includes an image-acquiring unit which acquires an image that is captured by photographing a photographic subject which is laid on an arbitrary place, a difference image producing unit which produces a difference image between the captured image that is acquired by the image-acquiring unit and an image which is captured before the photographic subject is laid, a contour extraction unit which extracts contour information of the photographic subject from the difference image that is produced by the difference image producing unit, and an image conversion unit which corrects a distortion of the captured image on the basis of the contour information that is extracted by the contour extraction unit.

14 Claims, 5 Drawing Sheets

U.S. PATENT DOCUMENTS

| | | | |
|---|---|---|---|
| 2006/0039608 A1* | 2/2006 | Nishida | 382/190 |
| 2006/0045379 A1* | 3/2006 | Heaney et al. | 382/276 |
| 2006/0228044 A1* | 10/2006 | Yeh et al. | 382/276 |
| 2008/0037838 A1* | 2/2008 | Ianculescu et al. | 382/118 |

FOREIGN PATENT DOCUMENTS

| | | |
|---|---|---|
| JP | 2005-115711 A | 4/2005 |
| JP | 2005-122327 A | 5/2005 |
| JP | 2005122326 A * | 5/2005 |

\* cited by examiner

IMAGE-CAPTURING APPARATUS, IMAGE PROCESSING METHOD AND PROGRAM PRODUCT

CROSS-REFERENCE TO RELATED APPLICATIONS

This application is based upon and claims the benefit of priority from prior Japanese Patent Application No. 2006-019681, filed Jan. 27, 2006, the entire contents of which are incorporated herein by reference.

BACKGROUND OF THE INVENTION

1. Field of the Invention

The present invention relates generally to an image-capturing apparatus such as a digital camera, and more particularly to an image-capturing apparatus which is suitable for use in photographing paper sheets such as paper documents and business cards, and to an image processing method and a program product for use in the image-capturing apparatus.

2. Description of the Related Art

In a case where a paper sheet such as a paper document or a business card is a photographic subject, the paper sheet has to be placed on the desk or the like and the photographer has to photograph the paper sheet with a camera situated downward from just above. As a result, the paper sheet may possibly be photographed in an oblique direction. Conventionally, to cope with this problem, contour information of the photographic subject is extracted from the image that is captured in the oblique direction, and a distortion of the captured image is corrected on the basis of the contour information (see, e.g. Jpn. Pat. Appln. KOKAI Publication No. 2005-115711).

However, since the paper sheet that is the photographic subject is photographed in the state in which the paper sheet is placed on the desk or the like, the edge portion of the desk, for example, becomes an obstacle to the photographing and the contour information of only the paper sheet that is the subject cannot correctly be extracted. If the contour information is not extracted, the distortion of the acquired image cannot be corrected. It is thus required to carefully photograph the paper sheet by placing it at the center of the desk so as to prevent the edge portion of the desk, for instance, from entering the range of photographing.

In addition, in a case where a plurality of paper sheets are photographed and the captured images are stored, if the paper sheets are overlaid and photographed, the contour of the previously photographed paper sheet becomes an obstacle and the contour of the newly placed paper sheet cannot exactly be extracted, and the captured image cannot be corrected. As a result, a timing-consuming work of, for example, replacing the paper sheets one by one is necessary.

BRIEF SUMMARY OF THE INVENTION

According to an aspect of the present invention, there is provided an image-capturing apparatus comprising: an image-acquiring unit which acquires an image that is captured by photographing a photographic subject which is laid on an arbitrary place; a difference image producing unit which produces a difference image between the captured image that is acquired by the image-acquiring unit and an image which is captured before the photographic subject is laid; a contour extraction unit which extracts contour information of the photographic subject from the difference image that is produced by the difference image producing unit; and an image conversion unit which corrects a distortion of the captured image on the basis of the contour information that is extracted by the contour extraction unit.

According to another aspect of the present invention, there is provided an image-capturing apparatus comprising: an image-acquiring unit which successively acquires images that are captured by successively photographing a plurality of photographic subjects while the photographic subjects are being overlaid on an arbitrary place; a difference image producing unit which produces a difference image between each of the captured images that are acquired by the image-acquiring unit and the image which is captured immediately previously; a contour extraction unit which extracts contour information of the photographic subject, which is newly laid, from the difference image that is produced by the difference image producing unit; and an image conversion unit which corrects a distortion of the captured image on the basis of the contour information that is extracted by the contour extraction unit.

According to still another aspect of the present invention, there is provided an image-capturing apparatus comprising: a difference image producing unit which produces a difference image between a captured image, which is acquired by photographing a photographic subject that is laid on an arbitrary place, and an image which is captured before the photographic subject is laid; a rectangle detection unit which detects a rectangular area on the basis of the difference image that is produced by the difference image producing unit; and an image conversion unit which clips an area corresponding to the rectangular area, which is detected by the rectangle detection unit, out of the captured image that is acquired by photographing the photographic subject laid on the arbitrary place, and corrects a distortion of a shape of the clipped image area.

According to still another aspect of the present invention, there is provided an image processing method comprising: acquiring an image that is captured by photographing a photographic subject which is laid on an arbitrary place; producing a difference image between the captured image that is acquired and an image which is captured before the photographic subject is laid; extracting contour information of the photographic subject from the difference image that is produced; and correcting a distortion of the captured image on the basis of the contour information that is extracted.

According to still another aspect of the present invention, there is provided an image processing method comprising: successively acquiring images that are captured by successively photographing a plurality of photographic subjects while the photographic subjects are being overlaid on an arbitrary place; producing a difference image between each of the captured images that are acquired and the image which is captured immediately previously; extracting contour information of the photographic subject, which is newly laid, from the difference image that is produced; and correcting a distortion of the captured image on the basis of the contour information that is extracted.

According to still another aspect of the present invention, there is provided an image processing method comprising: producing a difference image between a captured image, which is acquired by photographing a photographic subject that is laid on an arbitrary place, and an image which is captured before the photographic subject is laid; detecting a rectangular area on the basis of the difference image that is produced; and clipping an area corresponding to the detected rectangular area out of the captured image that is acquired by photographing the photographic subject laid on the arbitrary place, and correcting a distortion of a shape of the clipped image area.

According to still another aspect of the present invention, there is provided a program product recorded in a computer-readable recording medium and executed by a computer for controlling an image-capturing apparatus, the program product comprising: an image acquiring function of acquiring an image that is captured by photographing a photographic subject which is laid on an arbitrary place; a difference image producing function of producing a difference image between the captured image that is acquired by the image acquiring function and an image which is captured before the photographic subject is laid; a contour extracting function of extracting contour information of the photographic subject from the difference image that is produced by the difference image producing function; and an image converting function of correcting a distortion of the captured image on the basis of the contour information that is extracted by the contour extracting function.

According to still another aspect of the present invention, there is provided a program product recorded in a computer-readable recording medium and executed by a computer for controlling an image-capturing apparatus, the program product comprising: an image acquiring function of successively acquiring images that are captured by successively photographing a plurality of photographic subjects while the photographic subjects are being overlaid on an arbitrary place; a difference image producing function of producing a difference image between each of the captured images that are acquired by the image acquiring function and the image which is captured immediately previously; a contour extracting function of extracting contour information of the photographic subject, which is newly laid, from the difference image that is produced by the difference image producing function; and an image converting function of correcting a distortion of the captured image on the basis of the contour information that is extracted by the contour extracting function.

According to still another aspect of the present invention, there is provided a program product recorded in a computer-readable recording medium and executed by a computer for controlling an image-capturing apparatus, the program product comprising: a difference image producing function of producing a difference image between a captured image, which is acquired by photographing a photographic subject that is laid on an arbitrary place, and an image which is captured before the photographic subject is laid; a rectangle detection function of detecting a rectangular area on the basis of the difference image that is produced by the difference image producing function; and an image converting function of clipping an area corresponding to the rectangular area, which is detected by the rectangle detection function, out of the captured image that is acquired by photographing the photographic subject laid on the arbitrary place, and correcting a distortion of a shape of the clipped image area.

DETAILED DESCRIPTION OF THE INVENTION

An embodiment of the present invention will now be described with reference to the accompanying drawings.

Figure 1:
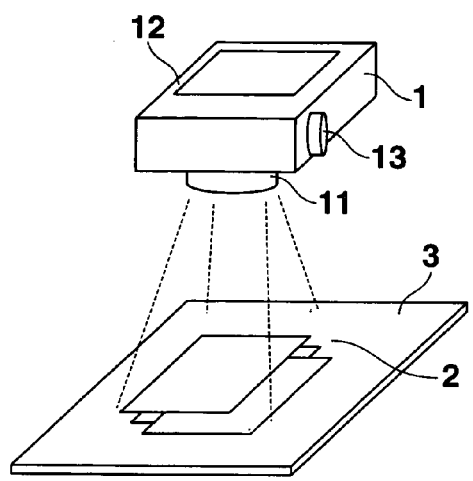
FIG. 1 shows a state of photographing in a case where a digital camera is used as an example of an image-capturing apparatus according to an embodiment of the present invention.

FIG. 1 is a view showing a state of photographing in a case where a digital camera is used as an example of an image-capturing apparatus according to an embodiment of the present invention.

A principal photographic subject of a digital camera 1 according to the embodiment is a paper sheet 2 which is laid on a table 3 such as a desk. The digital camera 1 has a function of correcting an image of a principal subject when the image of the principal subject is captured in an inclined direction, thereby generating an image as if it were captured in the frontal direction. The paper sheet 2 is, for instance, a paper document or a business card.

As shown in FIG. 1, the digital camera 1 includes an imaging lens unit 11, a liquid crystal monitor 12 and a shutter key 13.

The imaging lens unit 11 includes a lens for collecting light, and collects light from a photographic subject. The liquid crystal monitor 12 displays an image that is captured via the imaging lens unit 11. The shutter key 13 is an operation button for designating a photographing timing.

Figure 2:
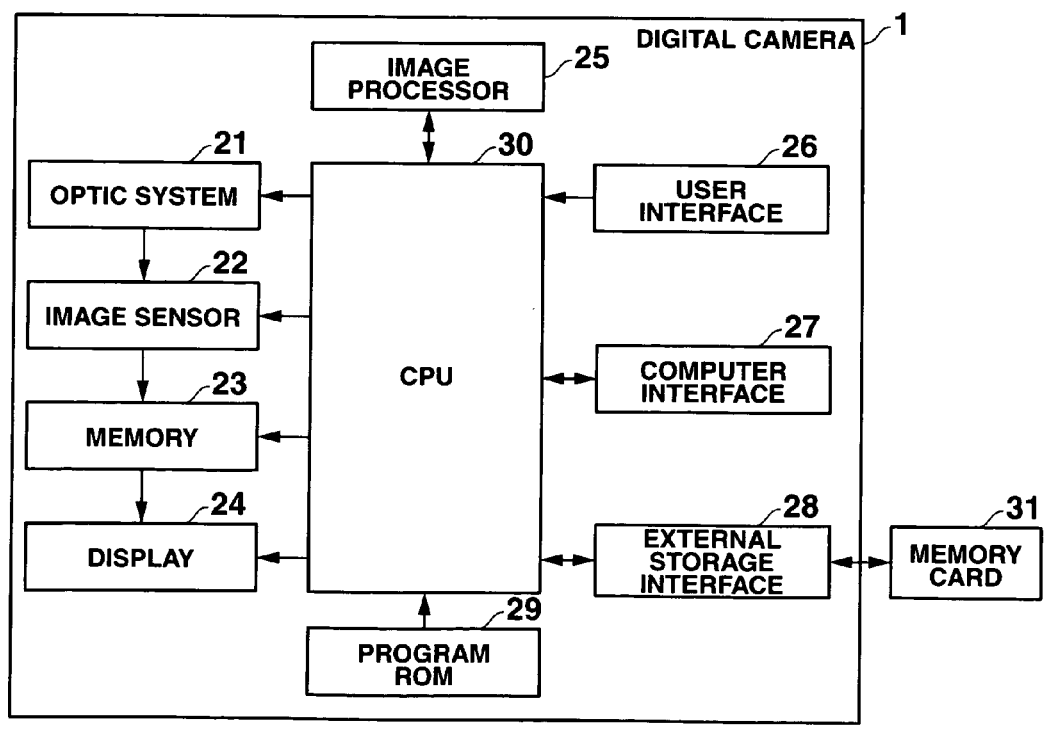
FIG. 2 is a block diagram showing a circuit configuration of the digital camera in the embodiment.

FIG. 2 is a block diagram showing a circuit configuration of the digital camera 1 according to the embodiment.

The digital camera 1 comprises an optic system 21, an image sensor 22, a memory 23, a display 24, an image processor 25, a user interface 26, a computer interface 27, an external storage interface 28, a program ROM 29, a CPU 30, and a memory card 31.

The optic system 21 includes the imaging lens unit 11 and a driving unit for the imaging lens unit 11. The optic system 21 converges light from the photographic subject on the image sensor 22, and focuses an image on the image sensor 22.

The image sensor 22 captures the image of the subject, which is focused by the optic system 21, as digitized image data. For example, the image sensor 22 is composed of a CCD (Charge-Coupled Device). The image sensor 22 is controlled by the CPU 30. Unless the shutter key 13 is pressed, the image sensor 22 generates image data with low resolution for preview, and periodically sends the image data to the memory 23 at an interval of about 30 frames per second. If the shutter key 13 is pressed, the image sensor 22 generates image data with high resolution, and sends the generated image data to the memory 23. The image-capturing sensitivity (ISO (International Organization for Standardization) sensitivity) of the image sensor 22 can be set by the CPU 30. The ISO sensitivity can be adjusted in accordance with the brightness of the photographic subject.

The memory 23 temporarily stores a preview image with low resolution or image data with high resolution from the image sensor 22, original image data that is processed by the image processor 25, and image data that is processed. The memory 23 delivers the temporarily stored image data to the display 24 or image processor 25.

The display 24 includes the liquid crystal monitor 12, and displays an image on the liquid crystal monitor 12. The display 24 displays, on the liquid crystal monitor 12, a preview image with low resolution or an image with high resolution, which is temporarily stored in the memory 23.

Figure 7:
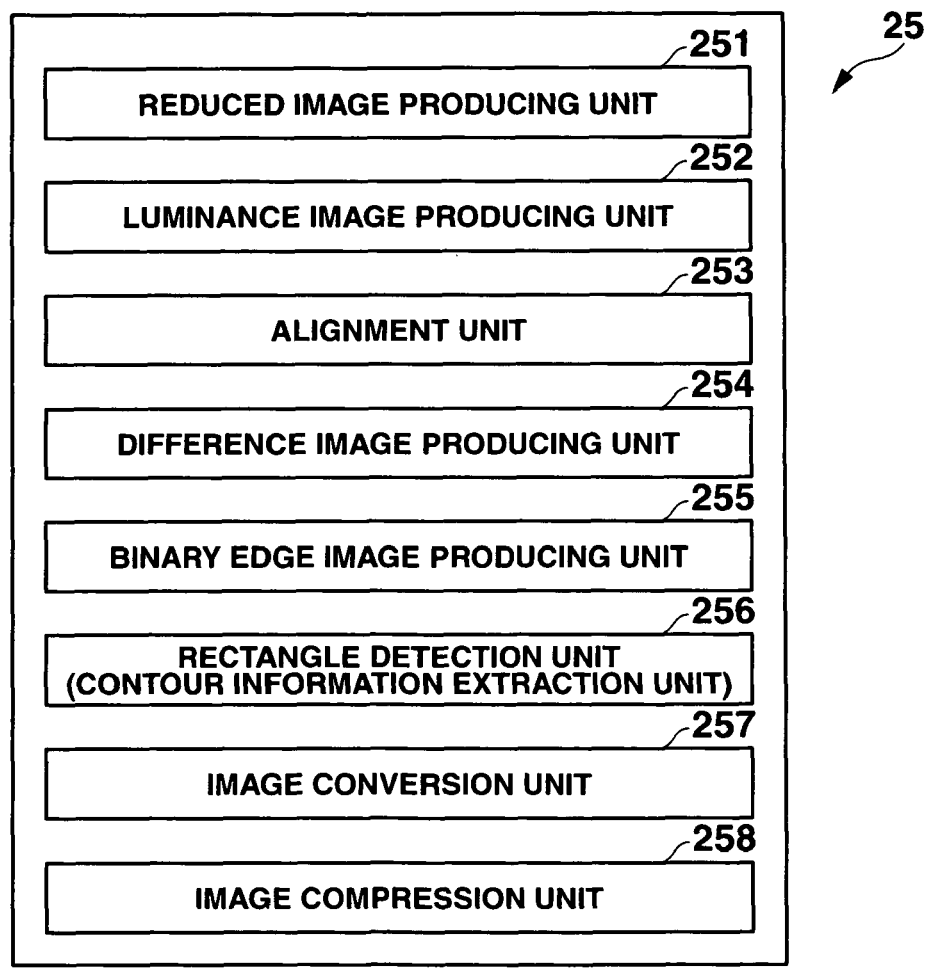
FIG. 7 is a view for describing the functional block structure in an image processor.

The image processor 25 is controlled by the CPU 30 and subjects the image data, which is temporarily stored in the memory 23, to image processing. In the present embodiment, the image processor 25 executes the following processes. FIG. 7 shows the functional block structure of the image processor 25.

(1) A process of producing a reduced image (reduced image producing unit 251)
(2) A process of producing a luminance image (luminance image producing unit 252)
(3) An image alignment process (alignment unit 253)
(4) A process of producing a difference image (difference image producing unit 254)
(5) A process of producing a binary edge image (binary edge image producing unit 255)
(6) A rectangle detection process (rectangle detection unit or contour information extraction unit 256)
(7) An image conversion process (image conversion unit 257)
(8) An image compression process (image compression unit 258).

The respective processes are explained below.

(1) Process of Producing a Reduced Image

The image processor 25 can produce a reduced image in which the number of pixels of an original image is reduced, by extracting only a predetermined number of pixels of interest from the original image.

At this time, it is preferable to average the values of pixels neighboring the pixels of interest in the original image, substitute the averaged pixel value as the value of the pixels of interest, and then extract the pixels of interest with the substituted pixel value.

For example, in the case where the size of the original image is (Xbmax, Ybmax) and the size of a reduced image to be produced is (Xsmax, Ysmax), it is thinkable, as indicated by formula 1, to find the value of each pixel q (k, l) ($1 \leq k \leq$ Xsmax, $1 \leq l \leq$ Ysmax) of the reduced image, which is to be produced, by averaging the values of nine pixels neighboring each pixel of interest p (x, y) in the original image.

$$\begin{cases} q(k, 1) = \frac{1}{9} \sum_{x=X-1}^{X+1} \sum_{y=Y-1}^{Y+1} p(x, y) \\ X = \text{Round}((k - 0.5) * X b\max / X s\max) \\ Y = \text{Round}((1 - 0.5) * Y b\max / Y s\max) \end{cases} \quad (1)$$

Round is a numerical value obtained by rounding a fraction below the decimal point.

For example, when the original image is XGA (1024×768) and the reduced image is QVGA (320×240), the calculation may be executed with Xbmax=1024, Ybmax=768, Xsmax=320, and Ysmax=240.

In the case where the image data in the camera comprises image data of an R component, image data of a G component and image data of a B component, it is preferable to execute the above process for each of the R component, G component and B component, that is, in units of a color component.

(2) Process of Producing a Luminance Image

In the case where the image data in the camera comprises image data of an R component, image data of a G component and image data of a B component, a luminance image is produced by calculating a luminance value Y of each pixel by the following formula 2.

$$Y=0.299R+0.587G+0.114B \quad (2)$$

(3) Image Alignment Process

When a plurality of photographing operation have been executed, the image processor 25 assumes that the position of the camera is displaced between the photographing operations. In order to correct the displacement, two images, which are captured with a time interval, are aligned.

To begin with, a predetermined number of characteristic points are extracted by a KLT method which is a representative method of finding characteristic points. In this case, since it is thought that the paper sheet 2, which is the photographic subject, is placed near the center of the table 3 shown in FIG. 1, the characteristic points are extracted from areas excluding the central area.

The KLT method is a method which makes use of a gradient method. In the KLT method, characteristic points are found from constraint conditions of the luminance gradient of respective pixels in the space and time. Specifically, if it is assumed that the luminance I (x, y, t) of a certain point (x, y) on an image at a time point t is equal to the luminance I (x+Δx, y+Δy, t+Δt) of a moving point after a minute time Δt, the following formula 3 is established.

$$I(x,y,t)=I(x+\Delta x, y+\Delta y, t+\Delta t) \quad (3)$$

Further, from formula 3, the following formula 4 can be derived.

$$I_x u + I_y v + I_t = 0 \quad (4)$$

In formula 4, u and v are velocity vectors of x and y, $I_x$ and $I_y$ are spatial luminance gradients, and $I_t$ is a temporal luminance gradient. The characteristic points are found on the basis of the condition that the constraint formula of the optical flow indicated by formula 4 and the optical flow in a local area are constant.

Subsequently, calculations are repeatedly executed by RANSAC method, thereby selecting correct characteristic points from a specified greater number of characteristic points including errors. In the RANSAC method, some of samples are taken out at random, and certain parameters are calculated from the taken-out samples. It is checked whether the obtained parameters match with all the samples, and the operation is repeated until the number of matching samples becomes sufficiently large. A transformation matrix of images is obtained from the selected correct characteristic points, and the positions of the two images are aligned by affine transformation. At this time, in the alignment, the first captured reference image is transformed, and the transformed image is made to accord with the subsequently captured object image.

The above-described image alignment process is executed on the luminance image that has been produced by the above-described (2) luminance image producing process.

(4) Process of Producing a Difference Image

By using the two luminance images for which the displacement of the camera is corrected by the (3) image alignment process, the image processor 25 calculates a difference between the pixels by formula 5 and produces a difference image.

Figure 5:
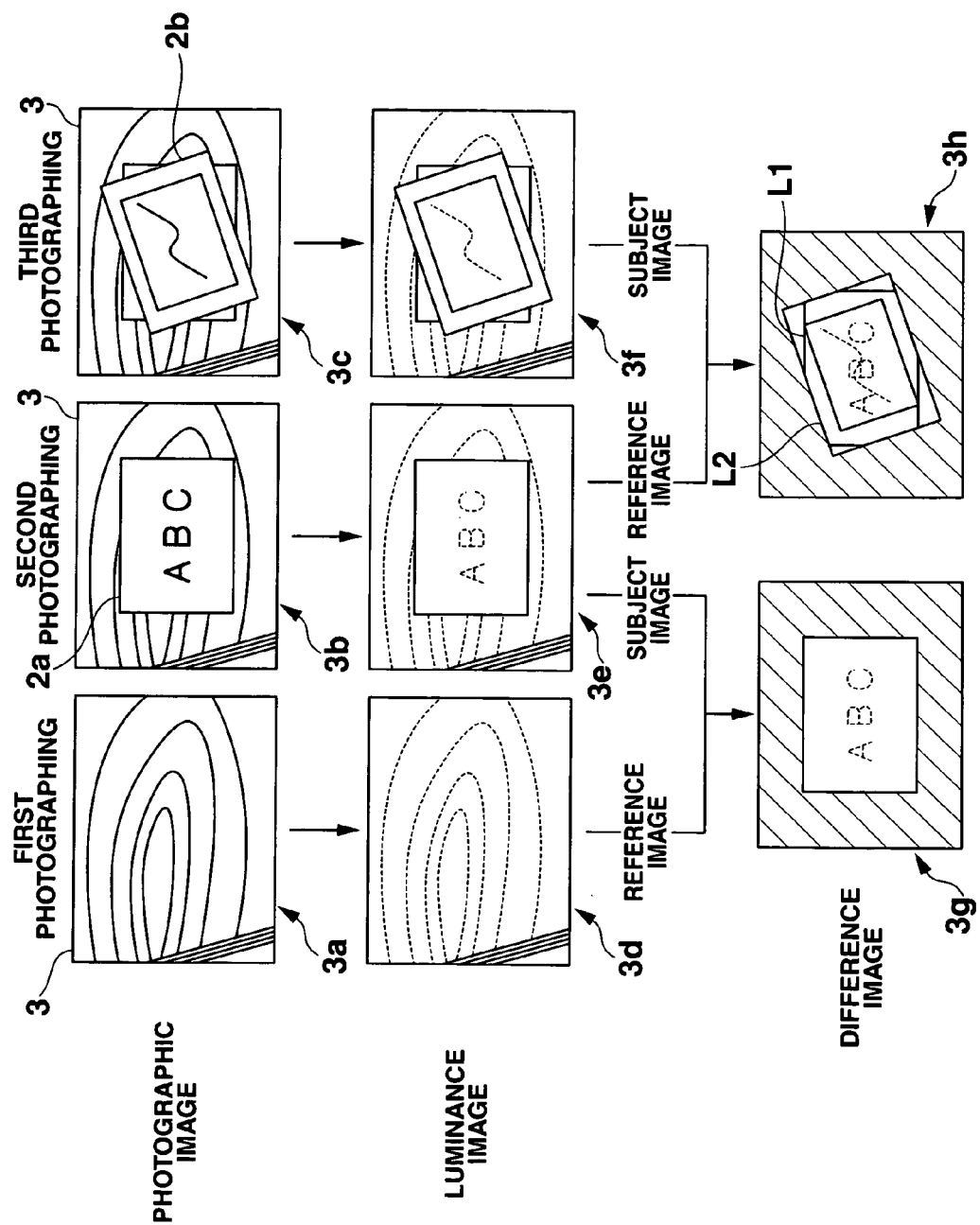
FIG. 5 shows a concrete example for explaining a photographing process of the digital camera according to the embodiment.

A difference image 3g shown in FIG. 5 is an example of a difference image between a luminance image 3d, which is obtained by converting the luminance of a first captured image 3*a* of three successively captured images 3*a*, 3*b* and 3*c*, and a luminance image 3*e* which is obtained by converting the luminance of a second captured image 3*b*. A difference image 3*h* shown in FIG. 5 is an example of a difference image between the luminance image 3*e*, which is obtained by converting the luminance of the second captured image 3*b* of the three successively captured images 3*a*, 3*b* and 3*c*, and a luminance image 3*f* which is obtained by converting the luminance of a third captured image 3*c*.

$$I_d(x,y) = |I_1(x,y) - I_2(x,y)| \quad (5)$$

(5) Process of Producing a Binary Edge Image

The image processor 25 detects edges from the original image (a reduced image in usual cases) or the above-described difference image, and produces a binary image with emphasized edges. For example, a filter for detecting edges, which is called "Roberts filter", is used in order to produce the binary edge image. The Roberts filter has the following scheme. Two of 4-neighboring pixels are weighted and two filters Δ1 and Δ2 are obtained. By averaging these filters, edges of an image are detected. If the Roberts filter is applied to the pixel value f (x, y) of coordinates (x, y) of interest, the pixel value g (x, y) after transformation is expressed by formula 6.

$$\begin{cases} g(x, y) = \sqrt{(\Delta 1)^2 + (\Delta 2)^2} \\ \Delta 1 = 1 \cdot f(x, y) + 0 \cdot f(x+1, y) + 0 \cdot f(x, y-1) - 1 \cdot f(x+1, y-1) \\ \quad = f(x, y) - f(x+1, y-1) \\ \Delta 2 = 0 \cdot f(x, y) + 1 \cdot f(x+1, y) - 1 \cdot f(x, y-1) + 0 \cdot f(x+1, y-1) \\ \quad = f(x, y) - f(x+1, y-1) \end{cases} \quad (6)$$

where g(x,y): a pixel value of coordinates (x,y) (after transformation), and
f(x,y): a pixel value of coordinates (x,y) (before transformation)

The edge image thus obtained is binarized. A threshold TH for the binarization may be fixedly determined or may be obtained by, e.g. a variable threshold method. From the edge image g (x, y) obtained by formula 6, an edge binary image h (x, y) of formula 7 is obtained.

$$h(x, y) = \begin{cases} 1 & \text{when } g(x, y) \geq TH \\ 0 & \text{when } g(x, y) < TH \end{cases} \quad (7)$$

(6) Rectangle Detection of a Photographic Subject

The rectangle detection of a photographic subject is a process of extracting a rectangular contour from the photographic image or the above-described binary edge image. In this embodiment, the rectangle detection process is used for contour detection of the table 3 or contour detection of the paper sheet 2.

The image processor 25 produces a binary edge image from the photographic image by the above-described (5) binary edge image producing process.

The image processor 25 executes Hough transform on the generated edge image, and detects straight lines that constitute the contour of the paper sheet.

Figure 3:
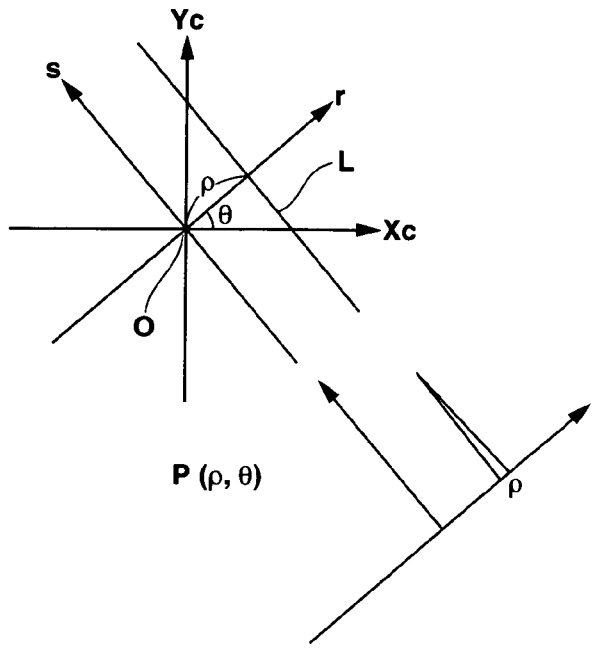
FIG. 3 is a view for explaining a method of extracting a line segment by Hough transform in the embodiment.

The Hough transform is one of methods of extracting a line segment. Points that form a straight line L on an X-Y plane shown in FIG. 3 are voted on a ρ-θ plane shown in FIG. 3 and are transformed to the number of votes on the ρ-θ plane. Specifically, a perpendicular line is drawn from the origin O to the straight line L. If the length of the perpendicular line is ρ and the angle between the perpendicular line and the X axis is θ, the length of the perpendicular line is ρ is expressed by formula 8.

$$\rho = x \cos \theta + y \sin \theta \quad (8)$$

In the case where the angle θ is varied from 0° to 360° on the coordinates (x, y) of the respective points, the same straight line is expressed by one point on the ρ-θ plane. Thus, the ρ-θ coordinates with a large number of votes can be determined as a straight line. In this case, since the number of votes corresponds to the number of pixels on the straight line, the number of votes can be regarded as the length of the straight line. Hence, the ρ-θ coordinates with an extremely small number of votes represent a short straight line, and are excluded from candidates of straight lines.

In the method using the Hough transform, as the number of points to be examined and the angle θ become larger, the processing speed decreases. It is thus preferable to reduce the image to a level corresponding to the precision of the angle that can be detected. For this reason, a reduced image is used for the rectangle detection. Thereby, the number of objects to be examined can be reduced.

Further, the angle for examination can be reduced by the method to be described below.

If consideration is given to the coordinate system in which the origin is the center of the edge image that is the object of examination, the value ρ may take a negative value. If the angle θ is measured in the range of 0°≦θ<180°, ρ takes a negative value in the remaining range of 180°≦θ<0°.

However, in the case where the center of the photographic subject is near the center of the image, the sides of the photographic subject (rectangle) that is actually photographed are present at up-and-down and right-and-left areas. In this case, it is more effective to measure the number of votes on the ρ-θ plane in the range expressed by formula 9, than in the range of 0°≦θ<180°.

$$\begin{cases} \text{Up and down sides:} \\ \quad 45° \leq \theta < 135° \text{ (or } 255° \leq \theta < 315°) \\ \text{Left and right sides:} \\ \quad 135° \leq \theta < 225° \text{ (or } 315° \leq \theta < 45°) \end{cases} \quad (9)$$

In addition, by checking whether the value of ρ is a positive value or a negative value, it is possible to specify the up-and-down direction or right-and-left direction of each side. Accordingly, in the case where the center of the photographic subject is near the center of the image, the sides that form the contour can be selected more efficiently.

In the case where the paper sheet 2 placed on the table 3 is photographed as shown in FIG. 1, the digital camera 1 photographs the paper sheet 2 from almost just above. Thus, a distortion of the shape of the paper sheet (rectangle) is small. Specifically, in the case where the photographic subject is the paper sheet, opposed sides are parallel and a vertical side and a horizontal side intersect substantially at right angles.

Since straight lines form the respective sides, the opposed sides are specified. Of these straight lines, straight lines with the same angle θ are regarded as being parallel. Further, if there are two parallel lines in another perpendicular direction, the rectangle of the contour (rectangular shape) is specified.

The areas of the obtained rectangles (rectangular shapes) are found, and the rectangle with the maximum area is specified as the contour of the paper sheet 2. The area of the rectangle is expressed by formula 10, if the values ρ of the upper and lower sides are ρt (positive value) and ρb (negative value), respectively, and the values ρ of the left and right sides are ρl (positive value) and ρr (negative value), respectively.

$$\text{Area} = (\rho t - \rho b) \times (\rho l - \rho r) \tag{10}$$

In this manner, on the basis of the specified contour (four straight lines), the ρ-θ coordinate system is transformed to the X-Y coordinate system, and four intersections $(x_0, y_0)$, $(x_1, y_1)$, $(x_2, y_2)$, and $(x_3, y_3)$ are obtained. The rectangle detection process is executed by this process.

In the case where the rectangle detection of the difference image is executed, if a previously photographed paper sheet lies under the newly placed paper sheet of the photographic subject with displacement, a part of the contour of the previously photographed paper sheet is left as image data (see L1 in FIG. 5), and it is possible that a number of candidates of sides are extracted by Hough transform. In this case, sides which are present inside are treated as noise, and the outermost sides (see L2 in FIG. 5) are detected as sides of the contour of the newly placed paper sheet of the photographic subject.

(7) Image Conversion Process (Clipping and Projection Correction)

The image conversion process is a process including clipping of an image and projection correction. The clipping process is a process for clipping out the image of the paper sheet 2, which is the photographic subject, from the photographic image on the basis of the extracted rectangle contour (four apices). In usual cases, the clipped image of the paper sheet 2, which is not corrected, is a distorted image.

The projection correction process is a process for projection-transforming the clipped image and correcting the distortion of the image, thus obtaining the image in the frontal direction. In order to correct the distortion, the image processor 25 uses affine transformation which is widely applied to spatial transformation of images. The image processor 25 extracts, from the original image of the paper sheet 2, affine parameters which indicate the relationship of affine transformation with the projection-corrected image. Based on the affine parameters A, the pixel points p (x, y) of the original image corresponding to the pixels P (u, v) of the projection-corrected image are obtained. Thereby, the projection correction process is executed.

Next, the basic concept (implementation method) of the affine transformation is explained.

The affine transformation is widely applied to spatial transformation of images. In the present embodiment, the projection transformation is executed by using two-dimensional affine transformation, without using three-dimensional camera parameters. The reason for this is that the points of coordinates (u, v) prior to transformation are subjected to transformation such as movement, enlargement/reduction and rotation and thereby the coordinates (x, y) after transformation are associated by formula 11. The projection transformation can also be executed by the affine transformation.

$$(x', y', z') = (u, v, 1) \begin{pmatrix} a_{11} & a_{12} & a_{13} \\ a_{21} & a_{22} & a_{23} \\ a_{31} & a_{32} & a_{33} \end{pmatrix} \tag{11}$$

The ultimate coordinates (x, y) are calculated by formula 12.

$$\begin{cases} x = \dfrac{x'}{z'} = \dfrac{a_{11}u + a_{21}v + a_{31}}{a_{13}u + a_{23}v + a_{33}} \\ y = \dfrac{y'}{z'} = \dfrac{a_{12}u + a_{22}v + a_{32}}{a_{13}u + a_{23}v + a_{33}} \end{cases} \tag{12}$$

Formula 12 is equations for projection transformation. The coordinates (x, y) decrease toward 0 in accordance with the value of z'. In other words, the parameters included in z' affect the projection. These parameters are $a_{13}$, $a_{23}$ and $a_{33}$. Since the other parameters can be normalized by parameters $a_{33}$, $a_{33}$ may be set at 1.

Figure 4:
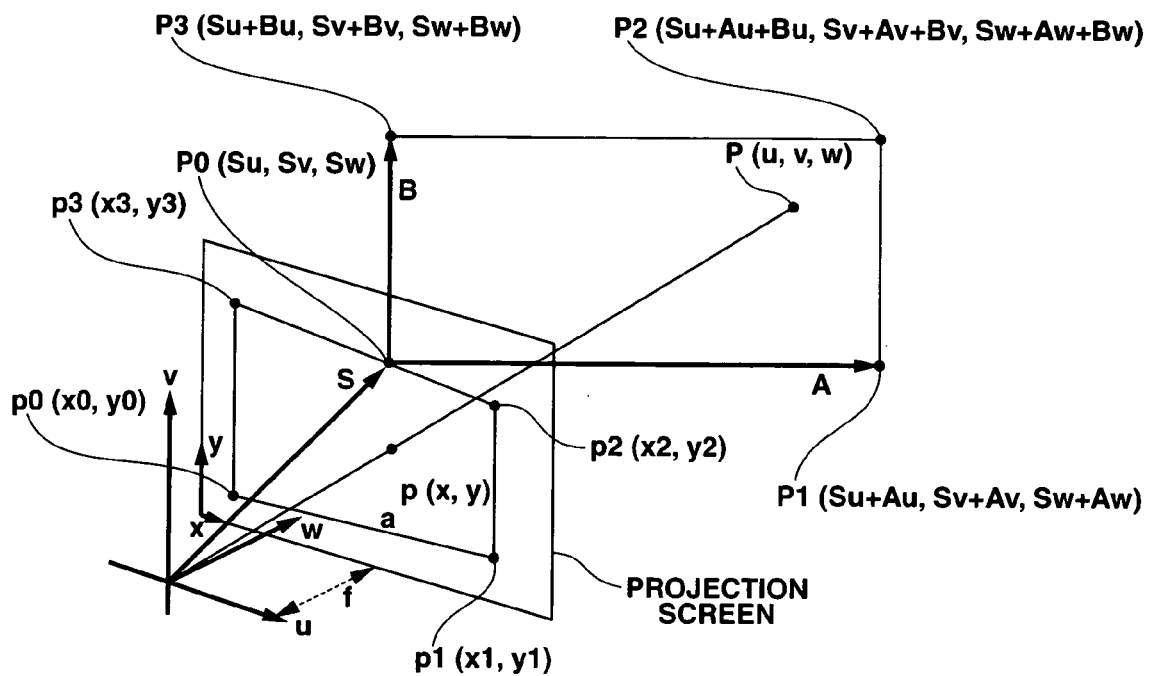
FIG. 4 is a view for explaining the relationship between a rectangle on a photographic image, which is acquired in a case of photographing a rectangular photographic subject in the embodiment, and an image of an actual photographic subject.

FIG. 4 is a view for explaining the relationship between the rectangle on the photographic image, which is captured by photographing the rectangular photographic subject (paper sheet 2), and the actual image of the photographic subject. In FIG. 4, the coordinates of the respective apices are indicated.

In FIG. 4, a U-V-W coordinate system is a 3D coordinate system of a photographic image which is captured by the digital camera 1. An A vector (Au, AV, Aw) and a B vector (Bu, Bv, Bw) represent the photographic subject in the 3D coordinate system U-V-W. An S vector (Su, Sv, Sw) represents a distance between the origin of the 3D coordinate system U-V-W and the photographic subject.

A virtual screen of the photographic image shown in FIG. 4 virtually shows an image which is displayed on the digital camera 1. The virtual screen is used to execute projection of the image of the photographic subject that is displayed on the virtual screen. If the coordinate system on the screen is (x, y), the image projected on the screen may be thought to be the image that is captured by the digital camera 1.

Assume now that the projection screen is perpendicularly situated at a distance f on the W axis. An arbitrary point P (u, v, w) on the photographic subject is connected to the origin by a straight line. It is assumed that there is an intersection at which this straight line crosses the projection screen, and the X-Y coordinates of this intersection are set at p (x, y). At this time, the coordinates p are expressed by formula 13 by projection transformation.

$$\begin{cases} x = u \dfrac{f}{w} \\ y = v \dfrac{f}{w} \end{cases} \tag{13}$$

From formula 13, the relationship represented by formula 14 is found on the basis of the relationship between the four apices P0, P1, P2 and P3 and projection points p0, p1, p2 and p3 on the projection screen, as shown in FIG. 4.

$$\begin{cases} Su = k_1 \cdot x_0 \\ Sv = k_1 \cdot y_0 \\ Sw = k_1 \cdot f \\ Au = k_1 \cdot \{x_1 - x_0 + \alpha \cdot x_1\} \\ Av = k_1 \cdot \{y_1 - y_0 + \alpha \cdot y_1\} \\ Aw = k_1 \cdot \alpha \cdot f \\ Bu = k_1 \cdot \{x_3 - x_0 + \beta \cdot x_3\} \\ Bv = k_1 \cdot \{y_3 - y_0 + \beta \cdot y_3\} \\ Bw = k_1 \cdot \beta \cdot f \end{cases} \tag{14}$$

where $k_1 = Sw/f$

At this time, projection coefficients α and β are expressed by formula 15.

$$\alpha = \frac{(x_0 - x_1 + x_2 - x_3) \cdot (y_3 - y_2) - (x_3 - x_2) \cdot (y_0 - y_1 + y_2 - y_3)}{(x_1 - x_2) \cdot (y_3 - y_2) - (x_3 - x_2) \cdot (y_1 - y_2)}$$

$$\beta = \frac{(x_1 - x_2) \cdot (y_0 - y_1 + y_2 - y_3) - (x_0 - x_1 + x_2 - x_3) \cdot (y_1 - y_2)}{(x_1 - x_2) \cdot (y_3 - y_2) - (x_3 - x_2) \cdot (y_1 - y_2)}$$

(15)

Next, the projection transformation is explained.

An arbitrary point P=(x, y) on the photographic subject is expressed by formula 16 by using the S, A and B vectors.

$$P = S + m \cdot A + n \cdot B \quad (16)$$

where m: a coefficient of A vector ($0 \leq m \leq 1$)

n: a coefficient of A vector ($0 \leq n \leq 1$)

If the relational expressions in formula 14 are substituted in formula 16, the coordinate x and coordinate y are expressed by formula 17.

$$x = \frac{m \cdot (x_1 - x_0 + \alpha \cdot x_1) + n \cdot (x_3 - x_0 + \beta \cdot x_3) + x_0}{1 + m \cdot \beta + n \cdot \alpha}$$

$$y = \frac{m \cdot (y_1 - y_0 + \alpha \cdot y_1) + n \cdot (y_3 - y_0 + \beta \cdot y_3) + y_0}{1 + m \cdot \beta + n \cdot \alpha}$$

(17)

If this relationship is applied to the formula (formula 11) of the affine transformation, the coordinates (x', y', z') are expressed by formula 18.

$$(x', y', z') = (m, n, 1) \begin{pmatrix} x_1 - x_0 + \alpha \cdot x_1 & y_1 - y_0 + \alpha \cdot y_1 & \alpha \\ x_3 - x_0 + \beta \cdot x_3 & y_3 - y_0 + \beta \cdot y_3 & \beta \\ x_0 & y_0 & 1 \end{pmatrix} \quad (18)$$

By substituting m and n in formula 18, the corresponding point (x, y) of the photographic image can be found. The corresponding point (x, y) is not limited to an integer value. Thus, the value of the pixel can be found by using, e.g. an image interpolation method.

As regards the above-described m and n, it is thinkable that an image size ($0 \leq u < umax$, $0 \leq v < vmax$) for outputting a corrected image p (u, v) is given in advance, and the image may be adjusted in accordance with the image size. According to this method, m and n are expressed by formula 19.

$$m = \frac{u}{u\max}$$

$$n = \frac{v}{v\max}$$

(19)

However, the aspect ratio of the corrected image to be produced does not accord with the aspect ratio of the photographic subject. Thus, the relationship between the corrected image p (u, v) and the values of m and n is expressed by formula 20 on the basis of formula 13 and formula 14.

$$k = \frac{|B|}{|A|} = \frac{\sqrt{(x_3 - x_0 + \beta \cdot x_3)^2 + (y_3 - y_0 + \beta \cdot y_3)^2 + (\beta \cdot f)^2}}{\sqrt{(x_1 - x_0 + \alpha \cdot x_1)^2 + (y_1 - y_0 + \alpha \cdot y_1)^2 + (\alpha \cdot f)^2}} \quad (20)$$

where f: camera parameter

If the focal distance f of the lens, which is a camera parameter, is already known, the aspect ratio k can be found according to formula 20. If it is assumed that the image size of the corrected image p (u, v) is ($0 \leq u < umax$, $0 \leq v < vmax$), the same aspect ratio k as the photographic subject can be obtained by finding m and n according to formula 21.

$$\begin{cases} (a) \text{ when } v\max/u\max \leq k, \\ m = \dfrac{u}{v\max} \\ n = \dfrac{v}{v\max} \quad (0 \leq u < u\max) \\ (b) \text{ when } v\max/u\max > k, \\ m = \dfrac{u}{u\max} \\ n = \dfrac{v}{u\max} \quad (0 \leq v < v\max) \end{cases} \quad (21)$$

In the case where the camera has a fixed focal point, the value of the focal distance f of the lens can be obtained in advance. In the case where there is a zoom lens or the like, the value of the focal distance f of the lens varies in accordance with the zoom magnification of the lens. Thus, a table indicating the relationship between the zoom magnification and the focal distance f of the lens is prepared and stored in advance. The focal distance f is read out on the basis of the zoom magnification, and the projection transformation is executed according to formula 20 and formula 21.

As has been described above, in order to obtain the value of the output image P (u, v) from the input image p (x, y), α and β are first obtained by formula 11 from the four apices ($x_0$, $y_0$), ($x_1$, $y_1$), ($x_2$, $y_2$) and ($x_3$, $y_3$). Then, the calculation of k is executed by formula 20.

Following the above, (m, n) is found from the coordinate values (u, v) of the output image by formula 21, and (m, n) is substituted in formula 18 and (x', y', z') is found. From formula 12, the corresponding pixel coordinates (x, y) of the input image are obtained. Since the pixel coordinates which are thus obtained are not integers, the pixel of the corresponding coordinates may be calculated by interpolating neighboring pixels. For example, if a bilinear interpolation method is adopted, the pixel can be calculated by formula 22.

$$P(u,v) = (1-kx)^*(1-ky)^*p(X,Y) + kx^*(1-ky)^*p(X+1,Y) + (1-kx)^*ky^*p(X,Y+1) + kx^*ky^*p(X+1,Y+1) \quad (22)$$

where, assuming that coordinates of point p of one of images are p (x, y), kx: a value of a fraction below the decimal point of x ky: a value of a fraction below the decimal point of y X: an integer part (x)

Y: an integer part (y)

(8) Compression of an Image

The image compression process is a process of compressing image data. The computer interface 27 operates as a USB storage class driver when the digital camera 1 is connected to a computer (not shown). Thereby, when the computer is connected to the digital camera 1, the computer handles the memory card 31 as an external storage device of the computer.

The external storage interface 28 executes input/output of, e.g. image data from/to the memory card 31. The memory card 31 stores image data, etc. which are delivered from the external storage interface 28.

The program ROM 29 stores a program that is executed by the CPU 30. The program ROM 29 is composed of a ROM, a flash memory, etc.

The CPU 30 controls the entire system according to the program that is stored in the program ROM 29. The memory 23 is also used as a working memory of the CPU 30.

The user interface 26 comprises, in addition to the shutter key 13, a power key, a photographing key and a reproduction key. In accordance with the key operation of the user interface 26, operation information corresponding to the key is sent. Based on the operation information, the CPU 30 controls the image sensor 22, memory 23, display 24 and image processor 25.

Specifically, if operation information that is indicative of depression of the photographing key is sent from the user interface 26, the CPU 30 sets the respective parts in the photography mode. If the shutter key 13 is not pressed in the state in which the respective parts are set in the photography mode, the CPU 30 sets the image sensor 22 in the preview mode. On the other hand, if the shutter key 13 is pressed in this state, the CPU 30 sets the image sensor 22 in the high-resolution mode for capturing an image of a photographic subject with high resolution. In addition, if operation information that is indicative of depression of the reproduction key is sent, the CPU 30 sets the respective parts in the reproduction mode.

The CPU 30 records the preview image and high-resolution image data in the memory card 31 via the external storage interface 28, or reads out the recorded image data from the memory card 31. The CPU 30 records image data, which is compressed with, e.g. a JPEG format, in the memory card 31.

When the CPU 30 temporarily stores the image data in the memory 23, the CPU 30 records the preview image and high-resolution image data in different memory areas. In addition, the CPU 30 records the image data in the memory card 31 by dividing the image data into image files.

Next, the specific process flow is described with reference to FIG. 6.

Figure 6:
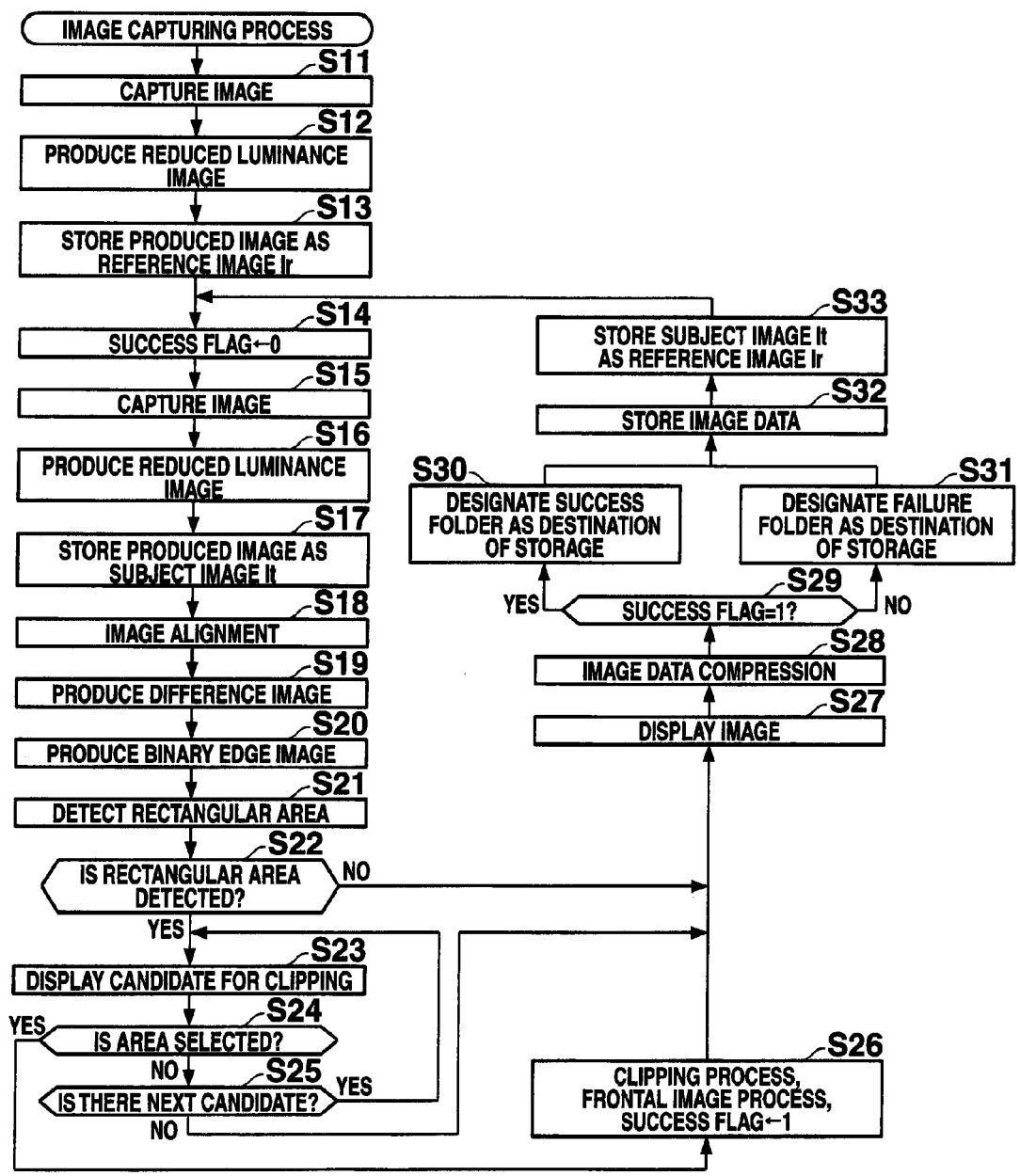
FIG. 6 is a flow chart illustrating the operation of the photographing process of the digital camera in the embodiment.

FIG. 6 is a flow chart illustrating the operation of the photographing process. The process illustrated in this flow chart is executed when the program, which is stored in the program ROM 29, is read in the CPU 30 that is a microcomputer.

To start with, in the state in which nothing is placed on the table 3, the user presses the shutter key 13 of the digital camera 1 and executes photographing. An example of a photographic image at this time is shown in FIG. 5 as a photographic image 3a. In this case, only the image of the table 3 is captured.

Specifically, if the user presses the shutter key 13 of the digital camera 1, the CPU 30 controls the optic system 21 and image sensor 22, reads out the image captured by the lens, and stores it into the memory 23 (step S11).

The stored photographic image 3a is delivered to the image processor 25. The photographic image 3a, which is delivered to the image processor 25, is subjected to the above-described reduced image producing process (1) and luminance image producing process (2) by the image processor 25. Thereby, the photographic image 3a is converted to a reduced luminance image (step S12). The reduced luminance image at this time is stored in the memory 23 as a reference image Ir for producing a difference image (step S13). In FIG. 5, an example of the reduced luminance image, to which the photographic image 3a is converted, is shown as a reduced luminance image 3d.

The reduced luminance image is an image which is produced in order to efficiently perform a difference image producing process in a subsequent step by reducing the data amount of the captured image. Thus, the reduced luminance image is not necessarily required.

After the converted reduced luminance image is stored as the reference image Ir, the CPU 30 sets a success flag at "0" and stands by for the next photographing (step S14). The success flag is identification information indicative of whether image correction is successfully executed or not. The success flag is stored, for example, in a flag area provided in the memory 23.

Subsequently, in the state in which a first paper sheet 2a is laid on the table 3, the user presses the shutter key 13 of the digital camera 1 once again and executes photographing. An example of a photographic image at this time is shown in FIG. 5 as a photographic image 3b. In this case, the image of the paper sheet 2a placed on the table 3 is captured.

Specifically, if the user presses the shutter key 13 of the digital camera 1, the CPU 30 controls the optic system 21 and image sensor 22, reads out the image captured by the lens, and stores it into the memory 23 (step S15).

The stored photographic image 3b is delivered to the image processor 25. The photographic image 3b, which is delivered to the image processor 25, is subjected to the above-described reduced image producing process (1) and luminance image producing process (2) by the image processor 25. Thereby, the photographic image 3b is converted to a reduced luminance image (step S16). The reduced luminance image at this time is stored in the memory 23 as a subject image It for producing a difference image (step S17). In FIG. 5, an example of the reduced luminance image, to which the photographic image 3b is converted, is shown as a reduced luminance image 3e.

Next, considering that a positional displacement of the camera has occurred between the time point of capturing the photographic image 3a and the time point of capturing the photographic image 3b, the alignment between the reference image Ir and subject image It stored in the memory 23 is executed by the above-described image alignment process (3) (step S18). By using the aligned reference image Ir and subject image It, a difference image Id is produced by the above-described difference image producing process (4) (step S19). The produced difference image Id is converted to a binary edge image Ib by the above-described binary edge image producing process (5) (step S20). In FIG. 5, an example of the difference image, which is produced from the reference image Ir (reduced luminance image 3d) and subject image It (reduced luminance image 3e), is shown as a difference image 3g. In this case, the image of only the paper sheet 2a on the table 3 is obtained as the difference image Id (difference image 3g).

Next, by the above-described rectangular subject detection process (6), a rectangular area is detected from the binary edge image Ib corresponding to the difference image Id (difference image 3g) (step S20). If the rectangular area is detected (Yes in step S22), the CPU 30 displays the rectangular area on the liquid crystal monitor 12 as a candidate for clipping, in accordance with the photographic preview image (step S23).

In the case of a photograph including an inner rectangular frame, such as a "photograph with a frame", not only the rectangular area representing the contour of the photograph but also the inner rectangular frame is detected as a rectangular area. In addition, in the case of a paper sheet on which a rectangular graphic is drawn, not only the rectangular area representing the contour of the paper sheet but also the rectangular graphic is detected as a rectangular area.

If many rectangular areas are detected, they are displayed as candidates for clipping and the user is prompted to select one of them. In this case, an outermost rectangular area of the detected rectangular areas is displayed with emphasis as a first candidate. Viewing the first candidate, the user selects "select" or "display next candidate" by operating a cursor key or the like (not shown). If the user selects "display next candidate" (Yes in step S25), an inner rectangular area, which is located inside the outermost rectangular area, is displayed with emphasis as the next candidate.

If the rectangular area that is displayed with emphasis is selected (Yes in step S24), the CPU 30 acquires the rectangular area as contour information of the photographic subject, and transforms the apex coordinates of the rectangular area to the coordinate system of the original image (e.g. photographic image 3b) according to formula 23. Thereafter, based on this coordinate information and original image data (e.g. photographic image 3b), the clipping and "frontal image process" (to be described below) of the paper sheet 2a, which is the principal photographic subject, are executed by the image conversion process (7) (step S26).

The "frontal image process" is projection correction. A distortion of the image, which occurs when the subject is photographed in an oblique direction, is corrected and an image in the frontal direction is obtained. If the distortion of the image is corrected by the frontal image process, the success flag is set at "1". The CPU 30 copies the corrected image to the memory area displayed on the display 24, and displays the corrected image (step S27).

$$\begin{cases} x'_i = \dfrac{x_{h\max}}{x_{s\max}} x_i \\ y'_i = \dfrac{y_{h\max}}{y_{i\max}} y_i \end{cases} \quad (23)$$

$i = 0, 1, 2, 3$

On the other hand, if the rectangular area is not detected (No in step 22) or if there is no rectangular area that is a proper candidate for clipping (No in step S25), the CPU 30 displays the latest captured image without executing the clipping of the photographic subject or the frontal image process (step S27). The success flag at this time is "0" that is a default value.

Next, the CPU 30 executes the compression process of the present image in the image processor 25 (step S28) and stores the compressed image in the memory card 31 via the external storage interface 28 (step S32). At this time, the destination of storage is changed according to the success flag.

Specifically, if the success flag is "1" (Yes in step S29), the CPU 30 designates a success folder as the destination of storage (step S30) and stores in the success folder the image data (corrected image) that is subjected to the compression process in step S28 (step S32). If the success flag is "0" (No in step S29), the CPU 30 designates a failure folder as the destination of storage (step S31) and stores in the failure folder the image data (non-corrected image) that is subjected to the compression process in step S28 (step S32).

As regards the image stored in the failure folder, it is used as such or it is manually corrected later by a predetermined operation by the user.

After the image is stored, the CPU 30 restores the subject image It (the latest captured image; e.g. reduced luminance image 3e), which is currently stored in the memory 23, as a new reference image Ir in preparation for the next photographing operation (step S33).

Next, another paper sheet 2b is laid over the previously photographed paper sheet 2a as a new photographic subject, and the user presses the shutter key 13 to execute photographing. In FIG. 5, an example of the photographic image at this time is shown as a photographic image 3c. In this case, an image in which the paper sheet 2b is laid over the paper sheet 2a on the table 3 is captured.

Specifically, if the user presses the shutter key 13 of the digital camera 1, the CPU 30 controls the optic system 21 and image sensor 22, reads out the image captured by the lens, and stores it into the memory 23 (step S15).

The stored photographic image 3c is delivered to the image processor 25. The photographic image 3c, which is delivered to the image processor 25, is subjected to the above-described reduced image producing process (1) and luminance image producing process (2) by the image processor 25. Thereby, the photographic image 3c is converted to a reduced luminance image (step S16). The reduced luminance image at this time is stored in the memory 23 as a new subject image It for producing a difference image (step S17). In FIG. 5, an example of the reduced luminance image, to which the photographic image 3c is converted, is shown as a reduced luminance image 3f.

Next, considering that a positional displacement of the camera has occurred between the time point of capturing the photographic image 3b and the time point of capturing the photographic image 3c, the alignment between the reference image Ir and subject image It stored in the memory 23 is executed by the above-described image alignment process (3) (step S18). By using the aligned reference image Ir and subject image It, a difference image Id is produced by the above-described difference image producing process (4) (step S19). The produced difference image Id is converted to a binary edge image Ib by the above-described binary edge image producing process (5) (step S20). In FIG. 5, an example of the difference image, which is produced from the reference image Ir (reduced luminance image 3e) and subject image It (reduced luminance image 3f), is shown as a difference image 3h. In this case, the image of only the paper sheet 2b, which is newly placed on the previously placed paper sheet 2a as the photographic subject, is obtained as the difference image Id. At this time point, it is assumed that a side, which forms a part of the contour of the paper sheet 2a, as shown by L1 in FIG. 5, is eliminated as noise.

Next, by the above-described rectangular subject detection process (6), a rectangular area is detected from the binary edge image Ib corresponding to the difference image Id (difference image 3h) (step S20). If the rectangular area is detected (Yes in step S22), the CPU 30 displays the rectangular area on the liquid crystal monitor 12 as a candidate for clipping, in accordance with the photographic preview image (step S23).

If many rectangular areas are detected, they are displayed as candidates for clipping and the user is prompted to select one of them. In this case, an outermost rectangular area of the detected rectangular areas is displayed with emphasis as a first candidate. Viewing the first candidate, the user selects "select" or "display next candidate" by operating the cursor key or the like (not shown). If the user selects "display next candidate" (Yes in step S25), an inner rectangular area, which is located inside the outermost rectangular area, is displayed with emphasis as the next candidate.

If the rectangular area that is displayed with emphasis is selected (Yes in step S24), the CPU 30 acquires the rectangular area as contour information of the photographic subject, and transforms the apex coordinates of the rectangular area to the coordinate system of the original image (e.g. photographic image 3c) according to formula 23. Thereafter, based on this coordinate information and original image data (e.g. photographic image 3c), the clipping and the frontal image process of the paper sheet 2b, which is the principal photographic subject, are executed by the image conversion process (7) (step S26).

If the image is successfully corrected by the frontal image process, the success flag is set at "1". The CPU 30 copies the corrected image to the memory area displayed on the display 24, and displays the corrected image (step S27).

On the other hand, if the rectangular area is not detected (No in step 22) or if there is no rectangular area that is a proper candidate for clipping (No in step S25), the CPU 30 displays the latest captured image without executing the clipping of the photographic subject or the frontal image process (step S27). The success flag at this time is "0" that is the default value.

Next, the CPU 30 executes the compression process of the present image in the image processor 25 (step S28) and stores the compressed image in the memory card 31 via the external storage interface 28 (step S32). At this time, the destination of storage is changed according to the success flag.

Specifically, if the success flag is "1" (Yes in step S29), the CPU 30 designates the success folder as the destination of storage (step S30) and stores in the success folder the image data (corrected image) that is subjected to the compression process in step S28 (step S32). If the success flag is "0" (No in step S29), the CPU 30 designates the failure folder as the destination of storage (step S31) and stores in the failure folder the image data (non-corrected image) that is subjected to the compression process in step S28 (step S32).

After the image is stored, the CPU 30 restores the subject image It (the latest captured image), which is currently stored in the memory 23, as a new reference image Ir in preparation for the next photographing operation (step S33).

Subsequently, each time a new photographic subject is placed and photographed, the process of step S14 to step S33 is repeated, and the captured photographic images are successively stored in the memory card 31.

As described above, by producing the difference image between the image of only the table, which is captured in the state in which the photographic subject is yet to be placed, and the image captured in the state in which the paper sheet (paper document, business card, etc.) that is the photographic subject is placed on the table, it becomes possible to obtain the image of the paper sheet without the background. The contour information of the paper sheet can exactly be extracted from the difference image, and the distortion of the photographic image can be corrected.

Also in the case where another paper sheet is photographed subsequently, it is not necessary to replace the paper sheet at each time of photographing. If the paper sheet that is to be newly photographed is laid over the paper sheet that has been photographed immediately previously, the difference image between the reference image, which is the immediately previously captured image, and the newly captured image is produced. From the difference image, the contour information of only the newly placed paper sheet can correctly be extracted. Therefore, even in the case where a plurality of paper sheets are photographic subjects, these paper sheets may simply be overlaid one after another, without taking care of the manner of placing the paper sheets. Thereby, the captured photographic images, which are corrected, can successively be stored in the memory and managed.

The image, which could not be corrected because the contour information could not be obtained, is stored in the failure folder. Thus, if this image is read out and manually corrected, it can be managed together with the images in the success folder.

In the present embodiment, the corrected image (referred to as "success image") and the non-corrected image (referred to as "failure image") are managed in the different folders. Alternatively, for example, identification information "S" may be added to the end part of the file name of the success image and identification information "F" may be added to the end part of the file name of the failure image. Thus, these images with distinguishable file names may be stored and managed in the same folder.

In the present embodiment, paper sheets, such as paper documents or business cards, are described as photographic subjects. The invention, however, is not limited to this embodiment. The invention is applicable to other photographic subjects which can be overlaid and photographed on the desk or the like.

The contour shape of the photographic subject is not limited to the rectangle (tetragon), and may be other various shapes.

The place where the photographic subject is laid is not limited to the desk, and may be any other place.

The present invention is applicable not only to digital cameras, but also to various kinds of electronic devices with image-capturing functions, such as camera-equipped mobile phones.

The present invention is not limited directly to the embodiment described above, and its components may be embodied in modified forms without departing from the spirit of the invention. Further, various inventions may be made by suitably combining a plurality of components described in connection with the foregoing embodiment. For example, some of the components according to the foregoing embodiment may be omitted. Furthermore, components according to different embodiments may be combined as required.

The method that is described in connection with the present embodiment may be constructed as a program that can be executed by a computer. The program may be stored in a recording medium such as a magnetic disk (e.g. a flexible disk, a hard disk), an optical disk (e.g. a CD-ROM, a DVD-ROM) or a semiconductor memory, and may be applied to various apparatuses. The program itself may be transmitted via transmission media such as networks, and may be applied to various apparatuses. The computer, which realizes the present apparatus, reads the program that is stored in the recording medium or the program that is provided via the transmission media, and the operation of the apparatus is controlled by the program. Thereby, the apparatus executes the above-described process.

What is claimed is:

1. An image-capturing apparatus comprising:
an image-acquiring unit which acquires a first image that is captured by photographing an arbitrary place in a state where a paper sheet is laid on the arbitrary place, the arbitrary place including a contour other than that of the paper sheet, and a second image that is captured by photographing the arbitrary place in a state where the paper sheet is not laid on the arbitrary place;
a difference image producing unit which produces a difference image between the first image and the second image acquired by the image-acquiring unit, thereby producing the difference image which includes contour information of the paper sheet and which does not include information on the contour other than that of the paper sheet;

a contour extraction unit which extracts the contour information of the paper sheet from the difference image that is produced by the difference image producing unit, wherein the contour information extracted from the difference image is used for correcting a distortion of the first image; and an image conversion unit which is configured to correct the distortion of the first image based on the contour information that is extracted by the contour extraction unit so as to obtain an image of the paper sheet as if it were photographed from a frontal direction.

2. The image-capturing apparatus according to claim 1, further comprising a storing unit which stores the first image, that is processed by the image conversion unit, in a predetermined format.

3. The image-capturing apparatus according to claim 2, wherein the storing unit stores the first image, which is successfully corrected by the image conversion unit, and an image including the paper sheet, which is not successfully corrected by the image conversion unit, in different folders.

4. The image-capturing apparatus according to claim 2, wherein the storing unit stores the first image, which is successfully corrected by the image conversion unit, and an image including the paper sheet, which is not successfully corrected by the image conversion unit, in a same folder and adds individual identification information to the images.

5. An image-capturing apparatus comprising:

an image-acquiring unit which successively acquires a first image that is captured by photographing an arbitrary place in a state where a first paper sheet is laid on the arbitrary place, and a second image that is captured by photographing the arbitrary place in a state where a second paper sheet is laid on the first paper sheet;

a difference image producing unit which produces a difference image between the first image and the second image acquired by the image-acquiring unit, thereby producing the difference image which includes contour information of the second paper sheet and which does not include contour information of the first paper sheet;

a contour extraction unit which extracts the contour information of the second paper sheet from the difference image that is produced by the difference image producing unit, wherein the contour information extracted from the difference image is used for correcting a distortion of the second image; and an image conversion unit which is configured to correct the distortion of the second image based on the contour information extracted by the contour extraction unit so as to obtain an image of the second paper sheet as if it were photographed from a frontal direction.

6. An image-capturing apparatus comprising:

a difference image producing unit which produces a difference image between a first image that is captured by photographing an arbitrary place in a state where a paper sheet is laid on the arbitrary place, the arbitrary place including a contour other than that of the paper sheet, and a second image that is captured by photographing the arbitrary place in a state where the paper sheet is not laid on the arbitrary place, thereby producing the difference image which includes contour information of the paper sheet and which does not include information on the contour other than that of the paper sheet;

a rectangle detection unit which detects a rectangular area based on the contour information of the paper sheet that is included in the difference image produced by the difference image producing unit; and an image conversion unit which clips an area corresponding to the rectangular area, which is detected by the rectangle detection unit, out of the first image, and which corrects a distortion of a shape of the clipped image area so as to obtain an image of the paper sheet as if it were photographed from a frontal direction, wherein the image conversion unit corrects the distortion of the shape of the clipped image area based on a shape of the rectangular area detected by the rectangle detection unit, and wherein the rectangular area detected by the rectangle detection unit is used for correcting the distortion of the shape of the clipped image area.

7. The image-capturing apparatus according to claim 6, further comprising a reduced image producing unit which produces reduced images of the first image and the second image, wherein the difference image producing unit produces the difference image based on the reduced images produced by the reduced image producing unit.

8. The image-capturing apparatus according to claim 6, further comprising a luminance image producing unit which, when the first image and the second image include image data of respective color components, produces respective luminance images based on the image data of the respective color components, wherein the difference image producing unit produces the difference image based on the luminance images produced by the luminance image producing unit.

9. An image processing method comprising:

acquiring a first image that is captured by photographing an arbitrary place in a state where a paper sheet is laid on the arbitrary place, the arbitrary place including a contour other than that of the paper sheet;

acquiring a second image that is captured by photographing the arbitrary place in a state where the paper sheet is not laid on the arbitrary place;

producing a difference image between the first image and the second image, thereby producing the difference image which includes contour information of the paper sheet and which does not include information on the contour other than that of the paper sheet;

extracting the contour information of the paper sheet from the produced difference image, wherein the contour information extracted from the difference image is used for correcting a distortion of the first image; and correcting the distortion of the first image based on the extracted contour information so as to obtain an image of the paper sheet as if it were photographed from a frontal direction.

10. An image processing method comprising:

successively acquiring a first image that is captured by photographing an arbitrary place in a state where a first paper sheet is laid on the arbitrary place, and a second image that is captured by photographing the arbitrary place in a state where a second paper sheet is laid on the first paper sheet;

producing a difference image between the first image and the second image, thereby producing the difference image which includes contour information of the second paper sheet and which does not include contour information of the first paper sheet;

extracting the contour information of the second paper sheet from the produced difference image, wherein the contour information extracted from the difference image is used for correcting a distortion of the second image; and correcting the distortion of the second image based on the extracted contour information so as to obtain an image of the second paper sheet as if it were photographed from a frontal direction.

11. An image processing method comprising:

producing a difference image between a first image that is captured by photographing an arbitrary place in a state where a paper sheet is laid on the arbitrary place, the arbitrary place including a contour other than that of the paper sheet, and a second image that is captured by photographing the arbitrary place in a state where the paper sheet is not laid on the arbitrary place, thereby producing the difference image which includes contour information of the paper sheet and which does not include information on the contour other than that of the paper sheet;

detecting a rectangular area based on the contour information of the paper sheet which is included in the produced difference image; and clipping an area corresponding to the detected rectangular area out of the first image, and correcting a distortion of a shape of the clipped image area so as to obtain an image of the paper sheet as if it were photographed from a frontal direction, wherein the distortion of the shape of the clipped image area is corrected based on a shape of the detected rectangular area, and wherein the detected rectangular area is used for correcting the distortion of the shape of the clipped image area.

12. A non-transitory computer-readable recording medium having stored thereon a program for controlling an image-capturing apparatus, the program being executable by a computer to perform functions comprising:

acquiring a first image that is captured by photographing an arbitrary place in a state where a paper sheet is laid on the arbitrary place, the arbitrary place including a contour other than that of the paper sheet;

acquiring a second image that is captured by photographing the arbitrary place in a state where the paper sheet is not laid on the arbitrary place;

producing a difference image between the first image and the second image, thereby producing the difference image which includes contour information of the paper sheet and which does not include information on the contour other than that of the paper sheet;

extracting the contour information of the paper sheet from the produced difference image, wherein the contour information extracted from the difference image is used for correcting a distortion of the first image; and correcting the distortion of the first image based on the extracted contour information so as to obtain an image of the paper sheet as if it were photographed from a frontal direction.

13. A non-transitory computer-readable recording medium having stored thereon a program for controlling an image-capturing apparatus, the program being executable by a computer to perform functions comprising:

successively acquiring a first image that is captured by photographing an arbitrary place in a state where a first paper sheet is laid on the arbitrary place, and a second image that is captured by photographing the arbitrary place in a state where a second paper sheet is laid on the first paper sheet;

producing a difference image between the first image and the second image, thereby producing the difference image which includes contour information of the second paper sheet and which does not include contour information of the first paper sheet;

extracting the contour information of the second paper sheet from the produced difference image, wherein the contour information extracted from the difference image is used for correcting a distortion of the second image; and correcting the distortion of the second image based on the extracted contour information so as to obtain an image of the second paper sheet as if it were photographed from a frontal direction.

14. A non-transitory computer-readable recording medium having stored thereon a program for controlling an image-capturing apparatus, the program being executable by a computer to perform functions comprising:

producing a difference image between a first image that is captured by photographing an arbitrary place in a state where a paper sheet is laid on the arbitrary place, the arbitrary place including a contour other than that of the paper sheet, and a second image that is captured by photographing the arbitrary place in a state where the paper sheet is not laid on the arbitrary place, thereby producing the difference image which includes contour information of the paper sheet and which does not include information on the contour other than that of the paper sheet;

detecting a rectangular area based on the contour information of the paper sheet which is included in the produced difference image; and clipping an area corresponding to the detected rectangular area out of the first image, and correcting a distortion of a shape of the clipped image area so as to obtain an image of the paper sheet as if it were photographed from a frontal direction, wherein the distortion of the shape of the clipped image area is corrected based on a shape of the detected rectangular area, and wherein the detected rectangular area is used for correcting the distortion of the shape of the clipped image area.

\* \* \* \* \*